United States Patent [19]

Parrish

[11] Patent Number: 4,604,079
[45] Date of Patent: Aug. 5, 1986

[54] SPEED CHANGER FOR ELECTRIC MOTOR

[76] Inventor: Kenneth D. Parrish, R.R. #4, Decatur, Ind. 46733

[21] Appl. No.: 668,744

[22] Filed: Nov. 6, 1984

[51] Int. Cl.[4] .............................................. F16H 7/14
[52] U.S. Cl. .................................. 474/114; 474/112; 248/666
[58] Field of Search ...................... 474/114, 112, 26; 248/666, 657; 74/392, 395, 397

[56] References Cited

U.S. PATENT DOCUMENTS

| | | | |
|---|---|---|---|
| 1,873,007 | 8/1932 | Meyer | 474/73 |
| 2,171,158 | 8/1939 | McCann | 474/88 |
| 2,695,529 | 11/1954 | Evans | 474/26 |
| 2,716,350 | 8/1955 | Phares | 474/69 |
| 2,753,722 | 7/1956 | De Grave | 474/78 |
| 2,851,892 | 9/1958 | Parkinson et al. | 474/88 |
| 2,901,195 | 8/1959 | Simpson | 248/666 |
| 3,169,414 | 2/1965 | Morin | 74/802 |
| 3,741,024 | 6/1973 | Bouthors et al. | 74/802 |
| 3,813,956 | 6/1974 | Whitecar | 474/88 |
| 4,404,867 | 9/1983 | Mueller et al. | 74/397 X |

FOREIGN PATENT DOCUMENTS 920159 11/1954 Fed. Rep. of Germany .

Primary Examiner—James A. Leppink
Assistant Examiner—Frank Mc Kenzie
Attorney, Agent, or Firm—Albert L. Jeffers; Anthony Niewyk

[57] ABSTRACT

A motor speed changer for an electric motor wherein a mounting platform is mounted directly to the end face of an electric motor by means of special fasteners. The fasteners comprise cylinders having eccentric portions thereon which are rotatable and alignable with the ends of the through bolts of the electric motor by rotation of the cylindrical fastener. The mounting platform is provided with an integral bearing housing and bearing for rotatably housing a jackshaft. The jackshaft is connected to the output shaft of the motor by means of a two pulleys and a drive belt.

15 Claims, 4 Drawing Figures

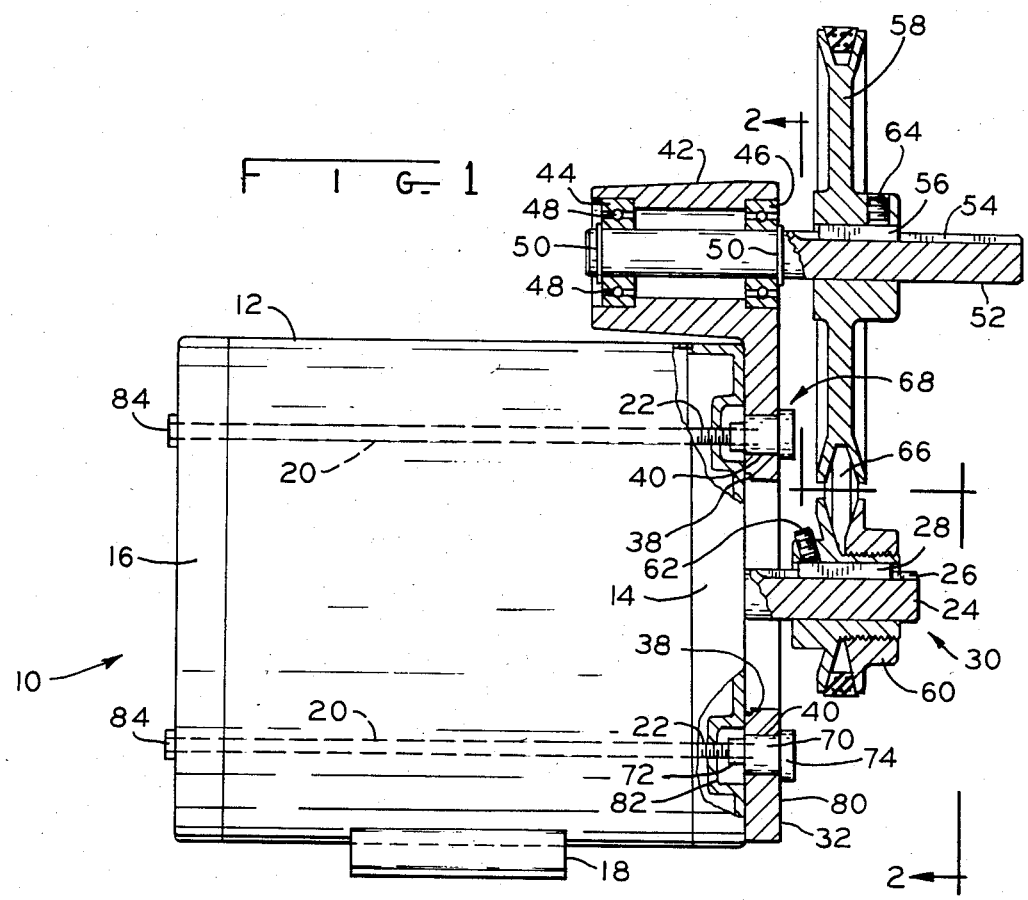
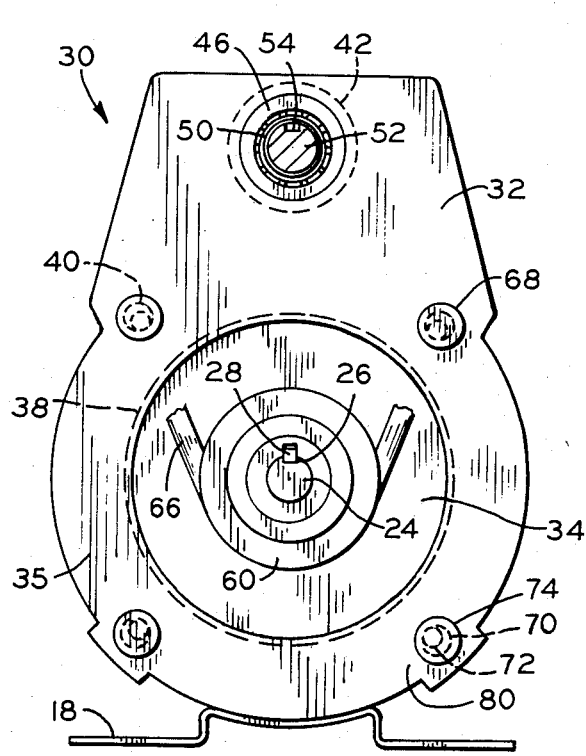
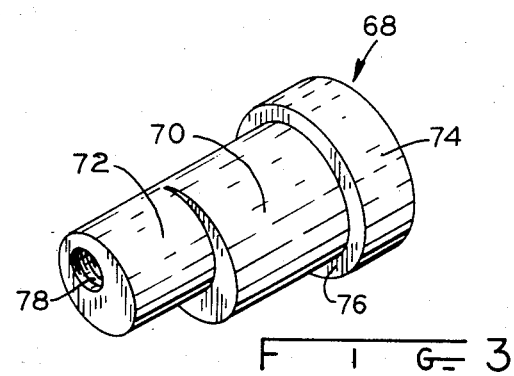

4,604,079

SPEED CHANGER FOR ELECTRIC MOTOR

BACKGROUND OF THE INVENTION

This invention relates to the field of motor speed changers and in particular the field of motor speed changers including jackshafts for changing the output speed of an electric motor.

Electric motors are used as prime movers in a great variety of applications, and many of those applications require a driving speed which is not readily available from standard electric motors. The output speed of electric motors is not normally variable so that in many instances a jackshaft speed changer arrangement must be provided to either increase or decrease the motor speed to a desired output speed. Many arrangements to accomplish this have been provided in the prior art. For instance in one arrangement, disclosed in U.S. Pat. No. 3,813,956, a speed changer is provided which is secured to the face of an electric motor by means of special fasteners and wherein a number of gears are used to provide an output speed of a jackshaft which is different from that provided by the output shaft of the motor. Several problems are inherent in this arrangement. For instance, special fasteners must be provided for securing the speed changer to the electric motor and the electric motor must be provided with special threaded apertures for receiving the fasteners. Additionally, the use of gears and timing belts is expensive and, furthermore, makes it difficult and time consuming to change the output speed of the speed changer.

In other prior art structures, mounting platforms have been provided for mounting a speed changer wherein the platform did not mount directly on the electric motor. Therefore, both the motor and the speed changer mounting platform had to be mounted separately on a base. In many applications, space is limited and this arrangement is unsatisfactory. Additionally, the alignment between the output shaft of the motor and the jackshaft in these arrangements becomes difficult to achieve because of the independent mounting of the motor and the speed changer.

In other prior art arrangements complicated bracket assemblies have been provided in order to mount a jackshaft on an electric motor. The expense of the numerous parts involved in these assemblies as well as the expense of assembling those parts is a severe disadvantage in those arrangements.

An additional problem which has been encountered in the prior art arrangements is that motor designs vary from one manufacturer to another. Therefore, in the prior art arrangements wherein the jackshaft is mounted directly on the housing of the electric motor a speed change could only be used with one motor design from only one manufacturer. This required stocking of additional motor speed changers for the different motor designs with the attendant expense inherent therein.

It is therefore desired to provide a universal unitary speed changer for mounting directly on an electric motor and which can be mounted on a variety of motors.

It is furthermore desired to provide a speed changer for mounting on an electric motor which is easy to mount and which can be mounted in a variety of positions.

It is also desired to provide a speed changer for an electric motor which is inexpensive and wherein the output speed can be changed easily.

SUMMARY OF THE INVENTION

The invention, in one form thereof, provides a unitary universal motor speed changer which can be mounted on a variety of electric motors and which includes a bearing for journalling a jackshaft and a mounting platform for mounting on an electric motor.

The invention, in one form thereof, also provides a universal unitary motor speed changer including a base, a bearing mounted on said base, a rotatable jackshaft received in the bearing and fasteners for securing the speed changer to the end face of an electric motor.

The invention, in one form thereof, further provides a universal unitary speed changer for an electric motor including an output shaft rotatably received in a bearing, a pair of pulleys one each of which is mounted on the motor output shaft and a jackshaft respectively and a belt for interconnecting the pulleys, and furthermore including fasteners received in apertures in the mounting base and adapted to be adjustable whereby they cooperate with the through bolts of the electric motor and are adjustable to engage with those through bolts despite varying locations of the through bolts and misalignment of the mounting base apertures with the through bolts.

An advantage of the present invention is that the speed changer is unitary and is mounted directly on the face of a motor so that no additional brackets are necessary for mounting the speed changer.

Another advantage of the present invention is that it is universally adaptable to different motor designs.

A further advantage of the present invention is that it is easy to mount on an electric motor without the use of special tools or the provision of special mounting apertures in the housing of an electric motor.

An additional advantage of the present invention is that the output speed of the speed changer is easy to change.

Yet another advantage of the present invention is that it is adapted to be used on both NEMA face motors as well as motors with other faces.

The invention, in one form thereof, provides a motor speed changer assembly for a motor having an output shaft, an end face and plurality of throughbolts extending through said end face. The assembly comprises a mounting base means adapted for mounting on the end face, and a plurality of apertures in the base, the apertures are arranged to align generally axially parallel with the throughbolts. A shaft is rotatably mounted on the base and is arranged with its axis parallel to the output shaft. A pair of pulleys is provided one each thereof mounted respectively on the output shaft and the jackshaft and a belt connects the pulleys. A plurality of fastener means for fastening the base to the end face is provided, each fastener comprising a cylinder portion rotatably received in one of the apertures, a shoulder means at one end of the cylinder portion for abutting an end surface of the base, and an eccentric portion connected to the cylinder portion opposite the shoulder and secured to the throughbolt ends.

The invention, in one form thereof, further provides a motor speed changer comprising a platform adapted to mount on the end face of an electric motor, and fastener means for mounting the platform. The fastener means comprises a cylinder rotatably received within a through aperture in the platform, a shoulder portion at one end of the cylinder abutting a face of the platform, and an eccentric portion on the cylinder opposite the shoulder portion and having a threaded aperture therein for securing the platform to a threaded end of a motor throughbolt, the eccentric being rotatable with the cylinder. A jackshaft is rotatably mounted on the platform together with a plurality of pulleys, one each thereof mounted respectively on the jackshaft and an output shaft of the motor and inter connected by a belt.

The invention, in one form thereof, also provides a motor speed changer comprising a planar mounting base including a plurality of apertures therein, the apertures arranged to align generally axially with the axes of the throughbolts of an electric motor. A plurality of securing means is provided for securing the mounting means to an end face of the electric motor, each securing means rotatably received within an aperture and comprising a cylindrical portion, an eccentric portion of reduced diameter abaxial with the cylindrical portion, and a portion having an enlarged diameter defining a shoulder means for engaging a face of the base. The eccentric portion includes a threaded bore for engaging the threaded end of a through bolt whereby each threaded bore is axially alignable with the through bolt.

It is an object of the present invention to provide a unitary universal motor speed changer which is easy to mount on the end face of an electric motor.

It another object of the present invention to provide a unitary motor speed changer which can be mounted on the end faces of a variety of electric motors.

It is yet another object of the present invention to provide a motor speed changer wherein the output speed is easy to change.

It is yet another object of the present invention to provide a motor speed changer which can be mounted without the use of special tools or modification of the motor housing.

It is still another object of the present invention to provide an electric motor speed changer which can be mounted on a NEMA face motor as well as other types of electric motors.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein:

FIG. 1 is a partially broken-away side elevational view of an electric motor with a speed changer mounted thereon.

FIG. 2 is an end view of the electric motor and speed changer assembly without the jackshaft output pulley.

FIG. 3 is a perspective view of the fastener for mounting the speed changer to the electric motor.

FIG. 4 is a end view of the fastener of FIG. 3.

DESCRIPTION OF THE PREFERRED EMBODIMENT

Referring to FIGS. 1 and 2 there is shown an electric motor 10 having a housing 12 and end faces 14 and 16 secured to the housing by means of through bolts 20. Generally, four such through bolts are provided spaced equidistantly around the circumference of the motor. A mounting bracket 18 is provided for mounting the electric motor. End bolts 20 are provided with threaded ends as best illustrated in FIG. 1, which ends extend through one of the end faces. The opposing ends of bolts 20 are provided with slotted screw heads 84. The motor is provided with an output shaft 24 which has a key slot 26 milled therein for receiving a key 28 as is conventional. A speed changer unit 30 is provided having a base or mounting platform 32. The base is preferably constructed of cast aluminum or iron and is provided with a central opening 34 thereby defining an annulus 35. A recess 38 is provided around the inner circumference of annulus 35 defining a stepped portion with opening 34. The recess 38 and its shoulder are provided to engage with a flange (not shown) provided on the NEMA end face of electric motors. The annulus 35 therefore comprises a female NEMA face. It should be understood that while special recess 38 is provided in the motor speed changer base thereby forming a female NEMA face for cooperating with the male NEMA face of electric motor 10 the speed changer mounting platform 32 is universal in nature and will fit on a variety of electric motors as hereinafter described.

Four apertures 40 are provided in mounting platform 32 for receiving fasteners 68 as further described hereinbelow. Additionally, mounting platform 32 is provided with a bearing housing 42. Received in bearing housing 42 are two bearings 44 and 46 including bearing balls 48. Bearings 44 and 46 could also comprise roller bearings and are secured in housing 4 by press-fitting. A jackshaft 52 is provided and is rotatably journalled in bearings 44 and 46 and is locked in place against axial movement by conventional C rings 50 received in circumferential grooves in shaft 52. Shaft 52 is also provided with a key slot 54 for receiving a key 56. Key 56 is also received in a matching key slot in pulley 58 whereby pulley 58 is locked to shaft 52 for rotation therewith. A pulley 60 is provided for mounting on motor output shaft 72 by means of key 28 which is received in key slot 26 in shaft 24 and a matching key slot in pulley 60. Set screws 62 and 64 are provided respectively for pulleys 60 and 58 and are threadedly received in the pulleys to lock keys 28 and 56 in place thereby securing the pulleys 58 and 60 to shafts 52 and 24 for rotation therewith. A belt 66 is provided for interconnecting pulleys 58 and 60 whereby driving pulley 60 drives driven pulley 58 and jackshaft 52 is rotatably driven at the desired output speed. It can readily be understood that pulleys 60 and 58 can be sized to achieve any desired output speed and that the speed can be adjusted both up and down. Furthermore, it can be readily understood that the speed of output jackshaft 52 can be changed easily by changing either one or both pulleys. If desired, either pulley 58 or 60 can comprise a variable sheave pulley whereby changes in speed can be achieved by adjustment of the variable pulley itself. The pulleys can also be replaced by sprockets and can be interconnected by means of a chain for a positive drive arrangement. The motor speed changer arrangement is therefore extremely flexible and adaptable to numerous applications requiring a variety of jackshaft speed and desired changes in jackshaft speeds can be easily effected.

Speed changer base 32 is secured to end face 14 of motor 10 by means of a special fasteners 68. Fasteners 68 are rotatably received in apertures 40 of mounting base 32. Fasteners 68 comprise a cylindrical mid-portion 70 and a head portion 74 of enlarged diameter. Portions 76 of head portions 74 adjacent cylindrical portions 70 define shoulders which cooperate with face 80 of mounting base 32 in the assembled position thereof and are in facing engagement therewith.

Fasteners 68 also include a cylindrical portion 72 of reduced diameter, connected to cylindrical portion 70 opposite head portion 74. The axis of reduced diameter portion 72 is parallel to but offset from the axis of cylindrical portion 70 whereby portion 72 defines an eccentric portion of fastener 68. The abaxial arrangement of portion 70 and 72 allows threaded bore 78 in portion 72 to be axially aligned with a through bolt 20 even though the axis of bolt 20 is not aligned with the axis of aperture 40.

It has been found that the location of through bolts 20 in electric motors varies from one manufacturer to another. By providing unique fasteners 68, a universally mountable speed changer arrangement is provided which can mount on a variety of motors with a variety of locations of through bolts 20. By inserting fasteners 68 in apertures 40, and then rotating fasteners 70, threaded cylindrical bores 78 can be aligned with through bolts 20 and can be fastened thereto, even though misalignment exists between bolts 20 and apertures 40. Portions 72 are sized so that they will fit in recesses 82 normally provided in the end face of an electric motor, as shown.

In operation, mounting base 32 is assembled to the end face 14 by aligning apertures 40 generally with the threaded ends 22 of through bolts 20. Four fasteners 68 are then inserted into openings 40 and are rotated until bores 78 align with threaded ends 22 of through bolts 20. Slotted screw heads 84 of through bolts 20 are rotated whereby through bolts 20 are secured to fasteners 68. Shoulder 76 of fastener heads 74 engage face 80 of base 32, whereby base 32 is securely fastened to motor end face 14. If the base is to be mounted on a NEMA face motor, special fasteners 68 need not be used. NEMA face motors have threaded recesses in the face thereof which align with openings 40. Screw type fasteners are inserted through openings 40 and are threadedly engaged in the threaded recess of the NEMA face of the motor to hold the base 32 securely thereto.

After fastening of mounting base 32, pulleys 60 and 58 are assembled on shafts 24 and 52 by inserting keys 56 and 28 in key slots 26 and 54 and tightening set screws 62 and 54 into engagement with the keys. Belt 66 is then arranged on the pulleys. The speed changer is then operable to provide a desired jackshaft output speed. The entire procedure takes only a few minutes to complete. If a different speed is desired, a different pulley and belt can be assembled in a matter of minutes.

Thus, a speed changer for an electric motor has been disclosed which is easy to assemble and which is universally adaptable to mount on a variety of electric motors. The mounting base 32 of the speed changer can be provided in a variety of sizes to fit motors of different frame sizes. The jackshaft speed obtainable with this motor speed changer can be both higher and lower than the output speed of the electric motor.

While this invention has been described as having a preferred design it will be understood that it is capable of further modification. This application is therefore intended to cover any variations, uses or adaptations of the invention following the general principles thereof and including such departures from the present disclosure as come within known or customary practice in the art to which this invention pertains and fall within the limits of the appended claims.

What is claimed is:

1. A motor speed changer assembly for a motor having an output shaft, an end face and a plurality of throughbolts extending through said end face, said assembly comprising;
    mounting base means adapted for mounting on said end face;
    a plurality of apertures in said base, said apertures arranged to align generally axially parallel with said throughbolts;
    a jackshaft rotatably mounted on said base and arranged with its axis parallel to said output shaft;
    a pair of pulleys, one each of said pulleys being mounted respectively on said output shaft and jackshaft;
    a belt connecting said pulleys;
    a plurality of fastener means for fastening said base to said end face, each fastener comprising a cylindrical portion rotatably received in one of said apertures, shoulder means at one end of said cylindrical portion for abutting an end surface of said base and an eccentric portion connected to said cylindrical portion opposite said shoulder and secured to said through bolt ends.

2. The speed changer assembly of claim 1 wherein said base is generally planar and includes a bearing for journalling said jackshaft.

3. The speed changer assembly according to claim 2 wherein said bearing is a ball bearing.

4. The speed changer assembly according to claim 1 wherein said base is made of cast aluminum, said base including a bearing housing for rotatably supporting said jackshaft, said housing cast integrally with said base.

5. The speed changer assembly of claim 1 wherein said throughbolts include threaded ends extending through said end face of said motor and wherein said eccentric portions include threaded apertures through, threadedly engaging said threaded throughbolt ends.

6. The speed changer assembly according to claim 1 wherein said base includes a shoulder portion for engaging a flange portion of a NEMA face of said electric motor.

7. A motor speed changer comprising;
    a platform adapted to mount on the end face of an electric motor;
    fastener means for mounting said platform and comprising a cylinder rotatably received within a through aperture in said platform, a shoulder portion at one end of said cylinder abutting a face of said platform, and an eccentric portion on said cylinder opposite said shoulder portion and having a threaded aperture therein for securing said platform to a threaded end of a motor throughbolt, said eccentric being rotatable with said cylinder;
    a jackshaft rotatably mounted on said platform; and
    a plurality of pulleys, one each of said pulleys mounted respectively on said jackshaft and an output shaft of said motor and interconnected by a belt.

8. The speed changer according to claim 7 wherein said base is comprised of iron, said base including a bearing housing for rotatably supporting said jackshaft, said housing cast integrally with said base.

9. The speed changer according to claim 7 wherein said base includes a female NEMA face.

10. The speed changer according to claim 7 wherein said base is generally planar and includes a bearing for journalling said jackshaft.

11. The speed changer according to claim 7 wherein said bearing comprises a roller bearing.

12. A motor speed changer comprising a planar mounting base including a plurality of apertures therein, said apertures arranged to align generally axially with the axes of the through bolts of an electric motor;
a plurality of securing means for securing said mounting means to an end face of said electric motor, each said securing means rotatably received within an aperture and comprising a cylindrical portion, an eccentric portion of reduced diameter abaxial with said cylindrical portion, and a portion having an enlarged diameter defining a shoulder means for engaging a face of said base, said eccentric portion including a threaded bore for engaging the threaded end of a said through bolt, whereby each said threaded bore is axially alignable with a said through bolt.

13. The motor speed changer of claim 12 including a bearing connected to said base and a shaft rotatably received therein.

14. The speed changer according to claim 13 including two pulleys one each thereof respectively mountable on said jackshaft and an output shaft of said motor, said pulleys engageable by a belt.

15. The speed changer according to claim 13 wherein said base includes a shoulder portion for engaging a flange on the NEMA face of the said motor.

* * * * *